United States Patent [19]
Campbell

[11] Patent Number: 4,618,152
[45] Date of Patent: Oct. 21, 1986

[54] HONEYCOMB SEAL STRUCTURE

[75] Inventor: James R. Campbell, South Laguna, Calif.

[73] Assignees: Thomas P. Mahoney, Balboa Island; Donald A. Ruston; Robert S. Barnes, both of Newport Beach, all of Calif.; part interest to each

[21] Appl. No.: 457,168

[22] Filed: Jan. 13, 1983

[51] Int. Cl.⁴ .............................................. F16J 15/40
[52] U.S. Cl. ...................................... 277/53; 415/174
[58] Field of Search ................ 415/174, 170; 277/203, 277/53

[56] References Cited

U.S. PATENT DOCUMENTS

| | | | |
|---|---|---|---|
| 2,668,327 | 2/1954 | Steele | 18/47.5 |
| 2,963,307 | 12/1960 | Bobo | 286/10 |
| 3,042,365 | 7/1962 | Curtis et al. | 253/39 |
| 3,046,648 | 7/1962 | Kelly | 29/155 |
| 3,053,694 | 9/1962 | Daunt et al. | 117/95 |
| 3,056,583 | 10/1962 | Varadi et al. | 253/78 |
| 3,068,016 | 12/1962 | Dega | 277/96 |
| 3,068,565 | 12/1962 | King et al. | 29/472.3 |
| 3,100,928 | 8/1963 | Bryand | 29/121 |
| 3,126,149 | 3/1964 | Bowers, Jr. et al. | 230/133 |
| 3,200,489 | 6/1957 | Keeleric | 415/174 |
| 3,227,600 | 1/1966 | Holland | 161/68 |
| 3,616,141 | 10/1971 | Anderson | 161/68 |
| 3,916,054 | 10/1975 | Long et al. | 428/117 |
| 4,063,742 | 12/1977 | Watkins, Jr. | 277/53 |
| 4,162,077 | 7/1979 | Crow et al. | 277/53 |
| 4,346,904 | 8/1982 | Watkins | 415/174 |

OTHER PUBLICATIONS

Solar Skills, Aviation Week, Sep. 22, 1958, p. 46.

Primary Examiner—Robert I. Smith
Attorney, Agent, or Firm—Thomas P. Mahoney

[57] ABSTRACT

An elongated metallic strip is provided which has oppositely disposed convolutions constituted by sinuosities, corrugations, nodes, or the like, and said convolutions are constituted by nadir and zenith convolutions. Provided on the nadir and zenith convolutions are cooperative hinge and locating means assisting in the juxtaposition of said nadir and zenith convolutions to one another, said integral hinge means being provided thereon to facilitate the disposition of such strip into a helical configuration. A seal is provided which is created by helically winding the strip to locate edges thereof in a cylindrical sealing configuration by juxtaposing the convolutions of the strip in operative relationship with one another and welding said convolutions to one another. The method of fabricating the aforesaid seal includes the progressive deformation of the metallic strip into a helical configuration with successive convolutions of said strip having juxtaposed zenith and nadir portions whose juxtaposition is facilitated by the provision of the cooperative locating and hinge means thereupon and the subsequent step of welding the juxtaposed zenith and nadir portions of the strip together. This invention relates to a honeycomb core strip, a seal fabricated from said honeycomb core strip and the method of fabricating said seal. It also relates to a flat configured panel fabricated from said core strip. Although the invention will be described as utilized to fabricate seals for use in jet engines, steam turbines and the like, the teachings of the invention can be applied with equal cogency in other applications and it is not intended, by disclosing the use of the invention in a particular application, to limit the use thereof.

13 Claims, 12 Drawing Figures

HONEYCOMB SEAL STRUCTURE

BACKGROUND OF THE INVENTION

It is well known to those skilled in the art that jet engines utilized in various types of aircraft and various types of gas and steam turbines incorporate seals which are of generally cylindrical configuration and which have surfaces engaged by the extremities of the compressor or turbine blades to restrict the bypassing of pressurized air or gases between the extremities of the blades and the respective sealing surface.

Many expedients have been utilized in the past in an attempt to solve the problem of turbine seal applications due to the fact that the generally accepted expedients have not been entirely satisfactory from the points of view of performance, expense of procurement and the critical question of fuel consumption by such engines as jet engines utilized in commercial and military aircraft.

In the compressor and turbine sections of jet and other engines a rotor consisting of a central shaft carrying one or more rows of radially extending blades rotates in a stationary housing or shroud. During the exposure of the rotor to high operating temperatures considerable initial clearance must be left between the tips of the blades and the housing or shroud to accommodate differential expansion between the rotor and the housing or shroud.

The necessity of providing sufficient clearance to allow for thermal expansion may result in the air or other gas being pumped past the tips of the rotor blades in significant quantities, significantly reducing the performance of the jet engine.

Since the inception of the energy crisis, renewed efforts have been made to reduce the fuel consumption of aircraft jet engines since the fuel bills of commercial airlines have increased to an extent where they constitute the dominant expenditure on the balance sheet of the airline. Therefore, any increase in the output of the jet engines will result in a corresponding decrease in the fuel consumed.

Numerous expedients have been offered by the prior art, including seals fabricated from honeycomb-type materials such as those disclosed in U.S. Pat. Nos. 2,963,307 issued Dec. 6, 1962 to Bobo, and 3,056,583 issued Oct. 2, 1962 to Varadi et al.

Also of interest is King No. 3,068,565, which discloses corrugated strips having internesting male and female nodes for the purpose of making honeycomb laminate.

Honeycomb seals, however, constructed in accordance with the present state of the art have numerous disadvantages. The cell sizes must be extremely small for the jet engine applications and such honeycomb materials are expensive. Another major disadvantage of conventional honeycomb materials is that they have hard spots at the flat nodal junctures where the double foil layer entraps more or less braze alloy, which, for higher temperatures is very hard and abrasive. Thus, these nodal junctures act as the equivalents of thousands of miniscule hack saw blades, end to end, and aligned with the direction of rotation of the rotor, which cut tiny notches in the blade tips when the aircraft encounters turbulence, a hard landing, or severe maneuvers and the whole rotor deflects elastically with respect to the engine case and the blade tips hit the seal surfaces. These tiny notches can result in severe damage to the blade tips, as they are crack starters.

Another characteristic of conventional honeycomb seals is the fact that they must be fabricated in flat panels which are subsequently cut and joined to form a circular seal which is supported by a corresponding rigid ring constituting a portion of the shroud or housing of the jet engine.

The formation of successive, connected pieces of honeycomb panel to provide a seal of the required diameter is an extremely tedious and time-consuming task. In addition, as the honeycomb panels are bent into arcuate configuration to conform to the requisite seal diameter, an anticlastic effect develops in that a saddleback or reverse curve will tend to form along the other major and perpendicular axis of the material when the attempt is made to form a simple curve along the major axis of the material. The anticlastic phenomenon is referred to in prior U.S. Pat. Nos. 2,668,327; 3,227,600 and 3,616,141. The 3,227,600 and 3,616,141 patents constitute efforts to fabricate a formable honeycomb in a flat panel which will be susceptible of deformation while avoiding the anticlastic phenomenon.

However, the resulting structures are really not suitable for the seal applications which are the primary consideration here.

Similar devices to that disclosed in U.S. Pat. No. 2,963,307 are disclosed in U.S. Pat. Nos. 3,046,648 and 3,100,928.

However, both of these patents are subject to the flat panel criticism in that the panel is first fabricated and then mounted on a retaining ring. Because of the anticlastic phenomenon, the seal suggested by the latter two patents is subject to the same criticism as the previously discussed prior art seals.

The present practice of fabricating turbine seals from a patchwork consisting of subsequently curved pieces of flat honeycomb panel entails the extensive machining of the resulting cylindrical seal member after the patching process and spike welding of seal to ring and subsequent brazing have been completed in order to eliminate such anticlasticity and other irregularities as may remain in the assembled seal. This machining is an expensive and time-consuming process which, taken in conjunction with the previous assembly of flat panel components of the seal, results in the high procurement cost thereof.

Other, alternative constructions suggested in the prior art include the unitary, grid-type material of U.S. Pat. No. 3,042,365.

It has also been proposed that honeycomb material incorporating larger cells be filled with an abradable, heat-resistant material as disclosed in U.S. Pat. Nos. 3,053,694; 3,068,016 and 3,126,149. Although axial gas flow past the rotor tips is reduced by constructions of this character, the other disadvantages of honeycomb-type seals are not eliminated and difficulties can be experienced in retaining the filler material in the honeycomb matrix.

Another prior art expedient has been the provision of a seal fabricated of felted metal fibers sintered into a mat. Like the seals of honeycomb construction reviewed above, sintered fiber seals incorporate fibers of small diameters which are highly susceptible to oxidization and suitable for applications wherein the temperature does not exceed about 1200° F., even when the most oxidization-resistant materials are employed. Moreover, in the process of welding or brazing the sintered material to the backing member, the brazing alloy or weld metal typically fills the interstices between the fibers by virtue of capillary flow. This significantly degrades the compliance and abradable nature of the material which are the primary characteristics desired in the particular field of application.

Typical of relatively recent attempts to cope with the problems incident to turbine seals is U.S. Pat. No. 3,916,054 which discloses a seal consisting of a plurality of compliant corrugated members which are secured only at their inner edges to a supporting ring.

A later form of abradable seal is shown in U.S. Pat. No. 4,063,742, while a wide channel seal is disclosed in U.S. Pat. No. 4,162,077.

Reference is hereby made to co-pending applications, Ser. No. 06/503,542, filed June 13, 1983, entitled "Method and Apparatus for Fabricating Honeycomb Seal", and Ser. No. 06/615,084, filed May 29, 1984, entitled "Apparatus for Fabricating Honeycomb Core Strip".

OBJECTS AND ADVANTAGES OF THE INVENTION

The ultimate object of my invention is the provision of a sealing ring for jet and turbine engines and similar devices which is characterized by numerous advantages over the prior art and the elimination of many of the detrimental aspects of prior art structures intended for the same applications.

Among the inherent advantages of my invention is the provision of a sealing ring of the aforementioned character which eliminates completely the anticlastic problems encountered in prior art utilization of honeycomb panels for fabricating engine seals.

Another object of my invention is the provision of a seal of the aforementioned character which eliminates, in most instances, the necessity for machining of the sealing surface of the seal after it has been mounted on the mounting ring therefor.

In order to achieve the seal construction of the invention, I provide a core strip construction for fabricating a multi-cell seal which is characterized by the provision of hinge means permitting the core strip to be deformed in two planes so that it may readily accommodate the necessary degree of curvature required by the internal diameter of the contemplated seal.

In one application of the hinge concept, I provide a core strip of corrugated configuration, said core strip having oppositely oriented nodal areas constituting, respectively, the zenith and nadir portions of the core strip. The hinge means are provided on these areas and are constituted by elongated beads which protrude upwardly from the nodal area surface and which are capable of accommodating radial deformation in two senses, namely the major deformation occurring as the core strip is wound, in a manner to be described in greater detail below, into the seal configuration about the axis of the rotor blades and the minor deformation which occurs as adjacent areas of the strip are rotated into juxtaposition with one another.

In other words, the hinge means is capable of accommodating the major radial deformation in the direction in which the core strip is wound to achieve the overall desired radius of the seal ring and is also capable of deformation across the nodal areas in a direction normal to the first radius of rotation.

Another advantage of the hinge construction alluded to hereinabove is the utilization of the corresponding beads as indexing means for the juxtaposed corrugations of the core strip or ribbon as the adjacent convolutions of the strip are progressively juxtaposed to bring the respective male and female nodal areas of the strip in operative relationship with one another.

In order to provide the maximum flexibility in the utilization of the core strip of the invention to fabricate the cylindrical or circular engine seal, the hinge bead of the female node of the strip may be of greater width than the male node to permit a desired amount of misalignment to be accommodated during the assembly of the successive convolutions of the core strip or ribbon in operative relationship with one another.

Although I have described, in a preliminary manner, the hinge means incorporated in the respective nodes of the core strip, I do not intend to be limited to the bead concept since alternative expedients such as dimples, and various other internesting cooperative recesses and protrusions may be utilized.

An additional object of my invention is the provision of a turbine seal fabricated from a continuous length of the aforementioned core strip or ribbon so that the core strip is helically wound to a predetermined interior diameter related to the outer diameter of the turbine blades with which the engine seal will be utilized. The engine seal of the invention is, therefore, not formed from a flat panel of honeycomb core material, but is generated as the finished product utilizing a continuous strip of the core strip or ribbon of the invention to create the multi-cell seal.

Although I refer herein to the utilization of a continuous strip of core strip or ribbon, it will be obvious to those skilled in the art that such core strip or ribbon may be constituted by a plurality of finite lengths welded to one another either prior to the securement of successive convolutions of the strip to one another or to the partially fabricated ring as the needs of the application may indicate.

Another object of my invention is a unitary engine seal fabricated from a continuous length of core strip or ribbon wherein the alternative male and female nodes of the successive convolutions of the core strip are welded or otherwise fixed to one another and the hinge means of the respective male and female nodes are internested to facilitate the securement of the respective nodes during the fabrication of the engine seal.

A further object of my invention is the provision of a method of fabricating the aforementioned engine seal which includes the concept of providing an elongated convoluted strip having alternate zenith and nadir nodal convolutions; subsequently winding said strip into a helical configuration while locating the nadir and zenith convolutions to one another as the strip is progressively wound into the helical configuration.

The mode of securement can be by such expedients as welding or brazing the nadir and zenith convolutions or nodal areas in operative relationship with one another.

However, it should be noted that, as the successive convolutions of the strip are wound into the cylindrical pattern of a dimension dictated by the respective diameter of the turbine blade assembly with which it will be utilized, the locating means provided by the hinge points of the strip serve to locate the respective nodal areas of the strip in operative relationship with each other prior to the securement of said nodal areas in operative relationship.

Another object of my invention is the provision of a method of fabricating the engine seal utilizing the welding technique which eliminates many of the deleterious effects of the prior art poke welding techniques.

It is well known to those skilled in the art that in poke welding two flat surfaces juxtaposed to each other are subjected to the welding finger causing the metal to stretch and thin and limiting the extent of the weld.

By utilizing the welding technique of my invention, the weld tip is imposed on the hinge bead and the amount of the material in the weld increases because it is being supplied by the inclined sidewalls of the juxtaposed beads.

An object of my invention is to provide an engine seal having a sinuous nodal zone to enhance abradability by the blade tip and reduce the hard spot effects resulting from conventional nodal abutments, which are flat and aligned with the blade tip motion.

Figure 2:
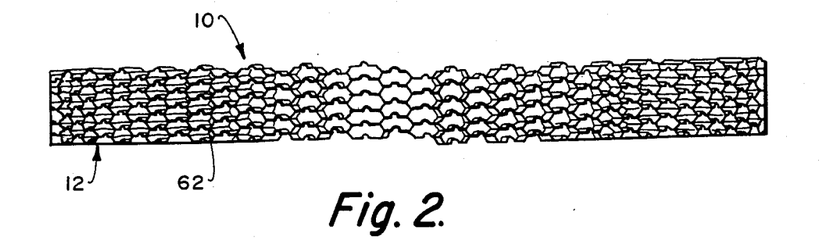
FIG. 2 is a view taken from the broken line 2—2 of the exterior surface of the engine seal.
Figure 3:
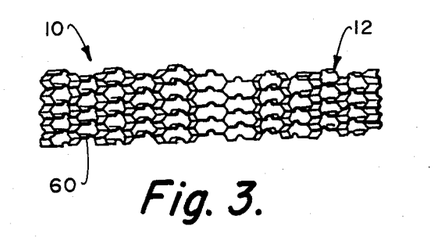
FIG. 3 is a view taken from the broken line 3—3 of the interior surface, which is the sealing surface of the engine seal.
Figure 9:
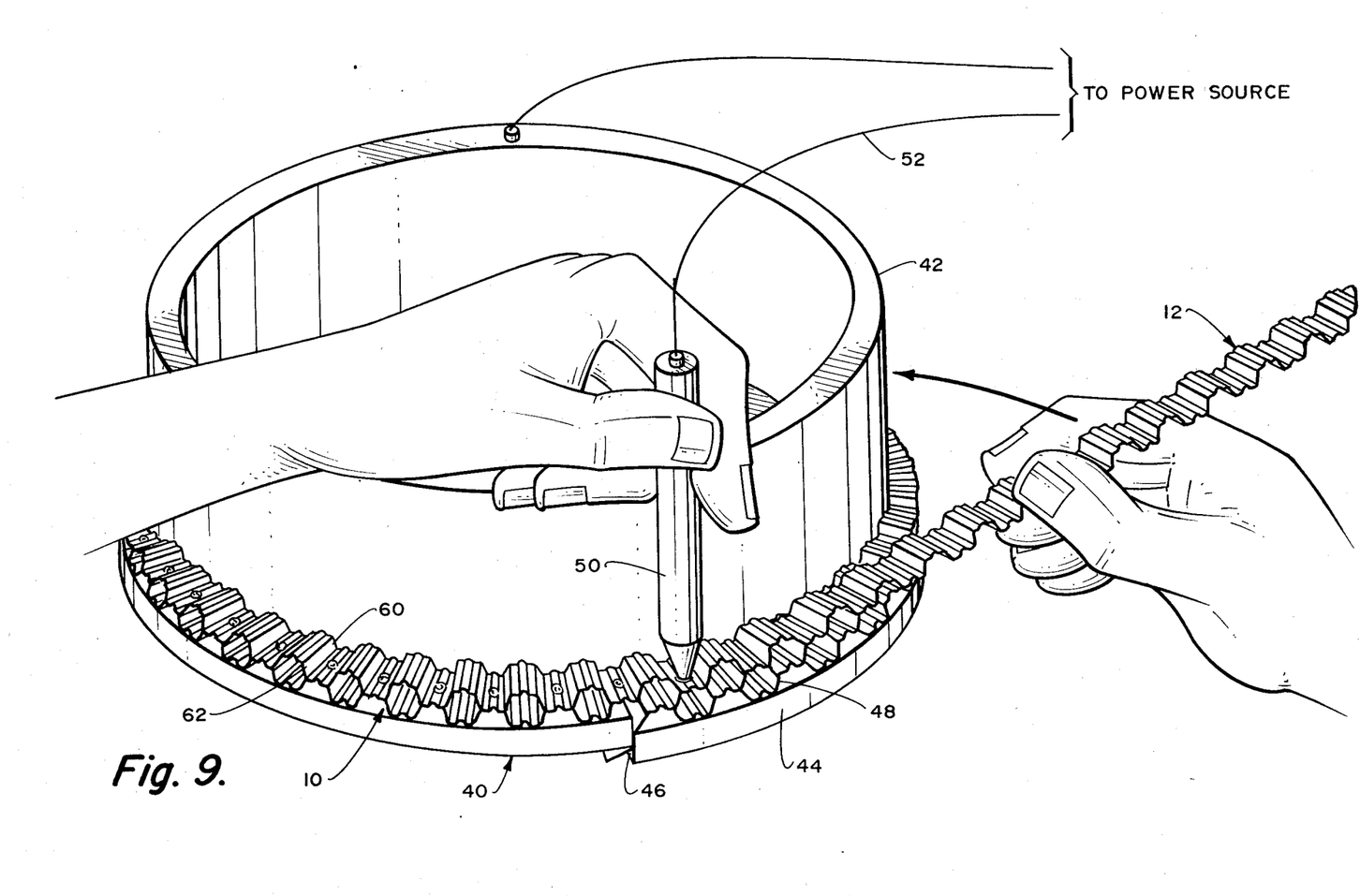
FIG. 9 illustrates an application of the method of the invention for assembling the engine seal.

Although the helical seal configuration offers the advantages of a better wear pattern, greater dimensional accuracy, and complete freedom from splices and the hard spots associated therewith, the start and finish of the helix result in small (1/32 inch on 1/16 cell core) steps as shown in FIGS. 2 and 9. These steps can be eliminated by means of a conventional splice. The helical seal may be cut at the cell walls adjacent the nodes, resulting in an approximate 30° parting of the seal. The start and finish are made to coincide with the 30° angle. After cutting, the seal is spliced in conventional manner and the steps are removed by splicing the ribbons in true ring form.

BRIEF DESCRIPTION OF THE DRAWINGS

Other objects and advantages of the invention will be apparent from the following specification and the accompanying drawings in which.

DESCRIPTION OF THE PREFFERED EMBODIMENTS OF THE INVENTION

The Core Strip

Figure 4:
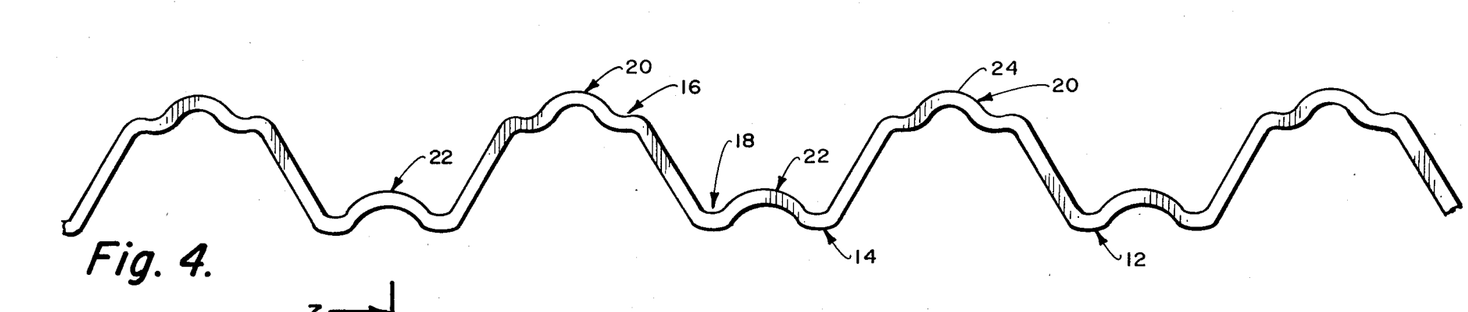
FIG. 4 is an enlarged fragmentary view of the core strip or ribbon of the invention shown in edge elevation.
Figure 5:
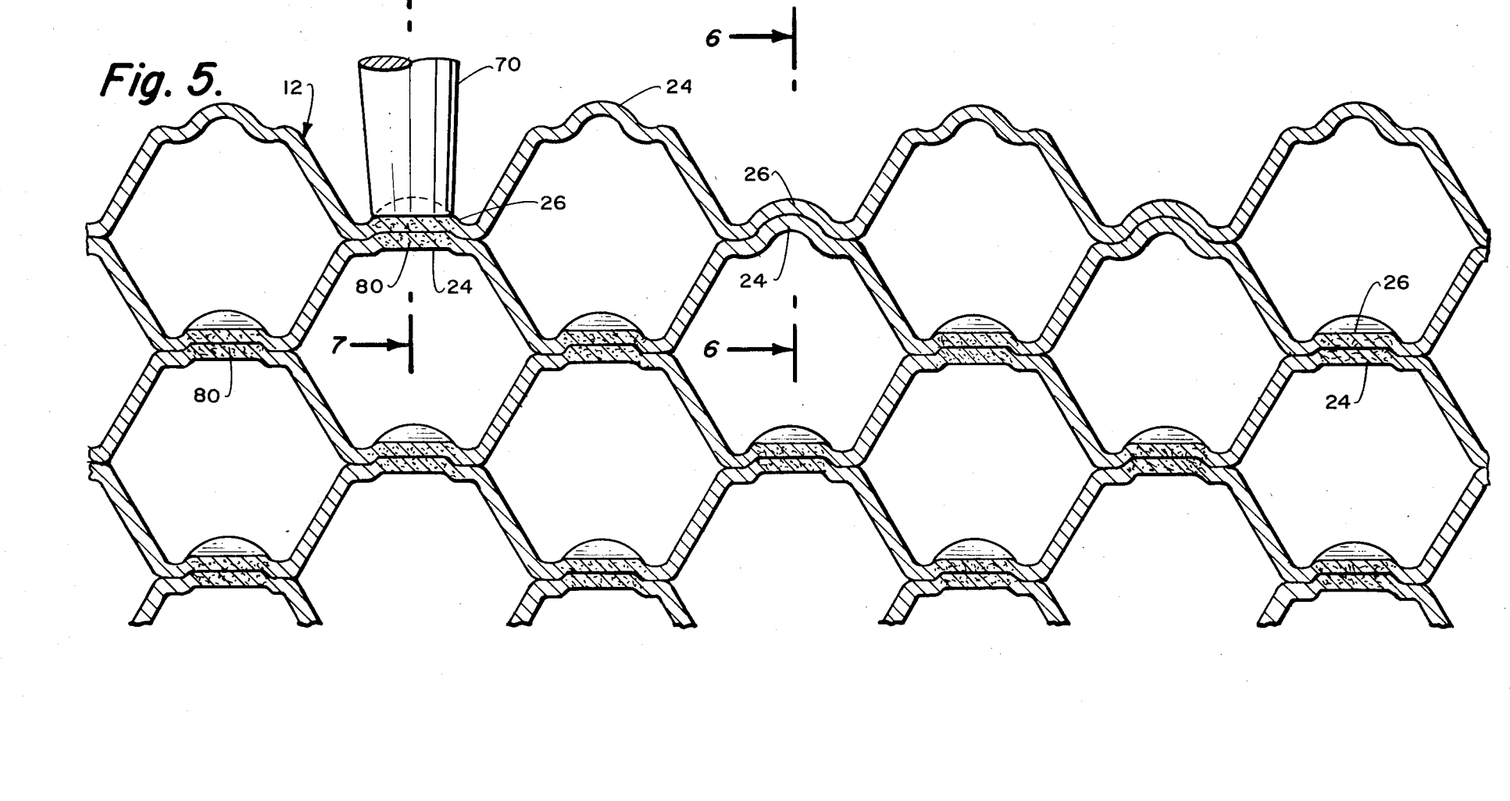
FIG. 5 is an enlarged fragmentary sectional view showing the juxtaposition of adjacent convolutions of the core strip as the method of the invention is utilized to fabricate the engine seal of the invention.

Referring to the drawings, and particularly to FIGS. 1–5 thereof, I show an engine seal 10 constructed in accordance with the teachings of my invention and embodying the core strip or ribbon 12 illustrated in FIGS. 4 and 5 of the drawings.

The core strip of FIGS. 4 and 5 of the invention consists of a sinuous elongated corrugated body 14 which includes alternate zenith portions 16 and nadir portions 18 which may also be referred to, respectively, as male and female nodes or male and female convolutions.

Conventionally, honeycomb core strip is ordinarily fabricated so that cells of essentially hexagonal shape result from the juxtaposition of successive nodal areas of the core strip with one another. Unfortunately, the utilization of flat panels fabricated from such core strip for engine seals reflects the fact that the hexagonal cell shape is inherently unsuitable for the achievement of a seal construction because of the anticlastic transverse curvature of the seal construction due to the inherent resistance of the core strip from which it is fabricated to rotary deformation in the two planes previously mentioned.

Substantial problems develop when curving conventional, hexagonal cell, flat panels of honeycomb core in any direction due to the anticlastic curvature which develops at 90 degrees to the desired direction of curvature. In the case of honeycomb engine seals, the flat core, usually having one-sixteenth of an inch cell size, is pressed against the surface of a seal support ring having any diameter in the range of from about three inches to perhaps 60 or more inches, and the resulting anticlastic curvature has to be pressed out or otherwise eliminated. When it is pressed out the honeycomb has to be tack welded to the seal support ring.

This operation is a repetitive one and actually never does provide an optimum fit-up between core and ring to achieve maximum securement by brazing of the ring and core.

During the pressing out of the conventional core panel, some of the node welds fail due to the high stresses imposed upon them by removal of the anticlastic curvature. Many of these failed node welds will have to be repaired or the cellular face of the seal will not meet the jet engine manufacturer's specifications after the seal material has been brazed to the seal supporting ring. This is a time-consuming and painstaking operation.

Furthermore, in conventional applications, the seal panel is applied to the ring in successive segments which requires precision splices where the seal segments meet with the accompanying onus of the anticlastic curvature.

Moreover, during the tack welding of the conventionally fabricated seal, conventional poke electrode welds are used to penetrate the braze foil by hand and this is another painstaking and time-consuming process, and creates the problem of the tack welds often being tack brazements which melt, during the brazing cycle, and release the core so that it tends to go back to its anticlastic shape and thus separate from the ring. The solution for this has generally been to use braze alloy powder instead of foil, which is extremely difficult to apply uniformly, in dry powder form or in a resin like vehicle which has to be out-gassed in the brazing furnace before initiating the actual braze cycle.

Ultimately, even though the basic foil from which the core is fabricated can be purchased to a slit width of plus or minus 0.001 or even plus or minus 0.0005 on special order, the installation of conventional core stock on the ring is so unpredictable and uneven that the inner surface of the seal has to be machined before it is acceptable by the jet turbine manufacturer.

Incidentally, it is contemplated that the core strip or ribbon 12 of the invention will be fabricated from Hastalloy, Inco 600, 347 stainless or any resistance weldable material in gauges ranging from 0.002 to 0.005. Of course, it can also be fabricated from a wide variety of other materials where the welding process is not utilized and where the high temperatures encountered in a jet engine turbine are not present.

Figure 6:
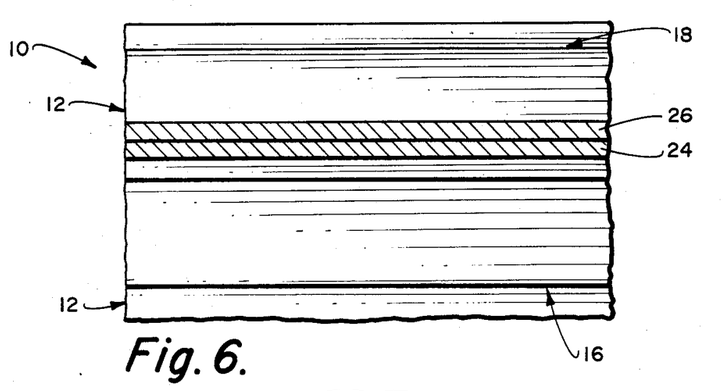
FIG. 6 illustrates the respective mating of the hinge means of the male and female nodes.
Figure 7:
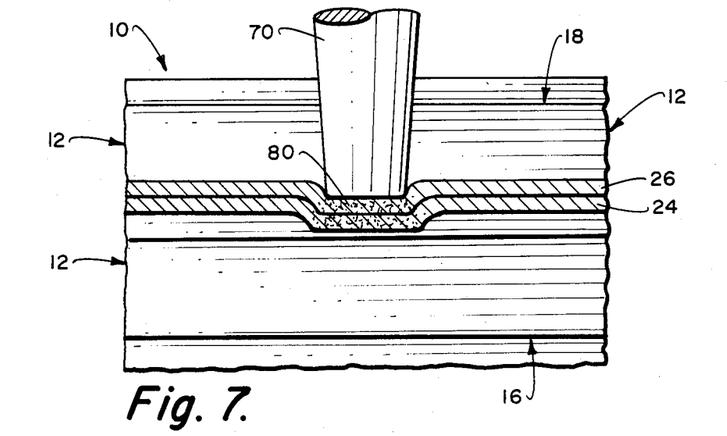
FIG. 7 illustrates the formation of a weld by the welding technique of my invention.

The core strips or ribbons 12 have hinge means 20 and 22 formed centrally of the male nodes 16 and the female nodes 18, respectively. The hinge means 20 and 22 are constituted by elongated beads 24 and 26, respectively, which extend, as best shown in FIGS. 6 and 7 of the drawings, from one edge of the core strip 12 to the other edge thereof.

In addition to acting as hinge means for the core strip 12, as will be described in greater detail below, the beads 24 and 26 also serve as locating means for the respective adjacent portions of the core strip 12 when the successive convolutions of the core strip 12 are juxtaposed to each other in the manner shown in FIGS. 1–3, 5 and 6–9 of the drawings. In order to permit the internesting of the beads 24 and 26 which occurs as the successive convolutions of the core strip 12 are wound into juxtaposition with one another, in a manner to be described in greater detail below, the female bead 26 is preferably of somewhat greater internal dimension than the external dimension of the male bead 24, thus permitting the male bead 24 to be readily received within the female bead 26.

For instance, the male bead may be formed on a 0.010R, while the female bead may be formed with a corresponding internal radius of 0.012R.

It should be noted that the core strip 12 can be formed by a variety of expedients, but I have chosen to form the strip on gear formers of a character well known to those skilled in the art. By this means, the strip can be fed in desired continuous lengths through the gear former so that a strip of a length requisite to fabricate a complete engine seal can be provided on a reel of core strip 12. By providing a continuous length of core strip 12, control of the tension to which the core strip is subjected during the fabrication of the seal 10 can be maintained to assure optimum quality.

However, it is conceivable that engine seals of greatly increased internal diameter may be indicated in the near future as the size of jet engines increases, and it is conceivable that it may be necessary to splice one length of core strip to the other during the manufacture of an engine seal. It is also conceivable that a length of strip be utilized to fabricate a portion of the seal and then an additional length of strip spliced to the seal itself where the previous core strip has its terminus.

Both expedients result in substantially the identical structure of the engine seal of my invention and it is not intended that the necessity for use of a plurality of lengths of core strip dictated by a large size engine seal 10 be permitted to avoid the scope and teachings of the invention.

Figure 11:
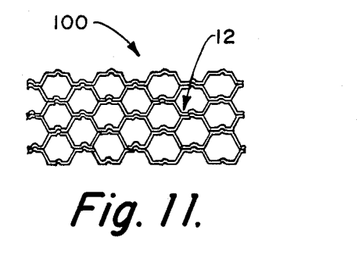
FIG. 11 discloses flat core fabricated from the core strip.

As previously mentioned, the core strip is primarily intended for use in the fabrication of engine seals, such as the engine seal 10, but it will be obvious to those skilled in the art that the core strip 12 can also be utilized to fabricate flat core 100 such as that illustrated fragmentally in FIG. 11 of the drawings.

Another important aspect of the dimensional difference between the male bead 24 and the female bead 26 is the fact that, when the successive convolutions of the core strip 12 are juxtaposed to one another, the male bead 24 assists in locating the superimposed convolution incorporating relevant female beads 26 prior to the weldment of the respective male and female nodes 16 and 18 in operative relationship with one another.

The Method of the Invention

During the fabrication of the engine seal 10, as best shown in FIG. 9 of the drawings, a fixture 40 is provided which includes a centrally-located cylinder or mandrel 42 having an external diameter directly related to the internal diameter of the seal 10 being fabricated thereupon. Secured to the base of the mandrel 42 is a supporting ring 44 which has an offset portion 46 for receiving the first convolution 48 of the core strip 12 placed on said ring 44.

Figure 10:
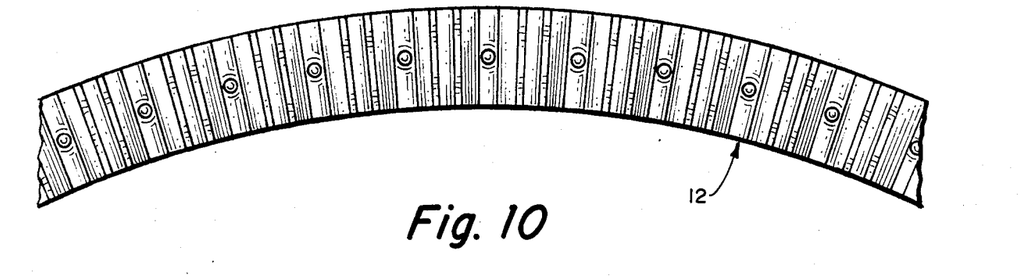
FIG. 10 illustrates the manner in which the core strip of the invention is capable of accepting rotary deformation encountered during the juxtaposition of the successive convolutions of the strip in operative relationship with one another.

When the material of the core strip 12 is welded by resistance welding techniques, a poke welder 50 of conventional configuration connected to a conventional welding circuit by a lead 52 may be utilized to form the successive weldments of the overlying and juxtaposed male and female beads 24 and 26 in operative relationship with each other. The beads 24 and 26 of the core strips 12 of FIG. 6 are illustrated in juxtaposed relationship to each other wherein they are completely internested. However, it should be noted that there is preferably a tolerance provided by the dimensional differences between the male and female beads 24 and 26, respectively, which provides for rotary distortion of the successive convolutions of the strip 12 with respect to one another during the assembly and welding processes. This distortion in both major and minor rotary senses is illustrated in FIG. 10 of the drawings which indicates the bending of the core strip or ribbon 12 about the major axis of the engine seal 10. Also illustrated in FIG. 10 is the plane of rotary movement of the nodes transverse to the axis of major rotary deformation.

Figure 1:
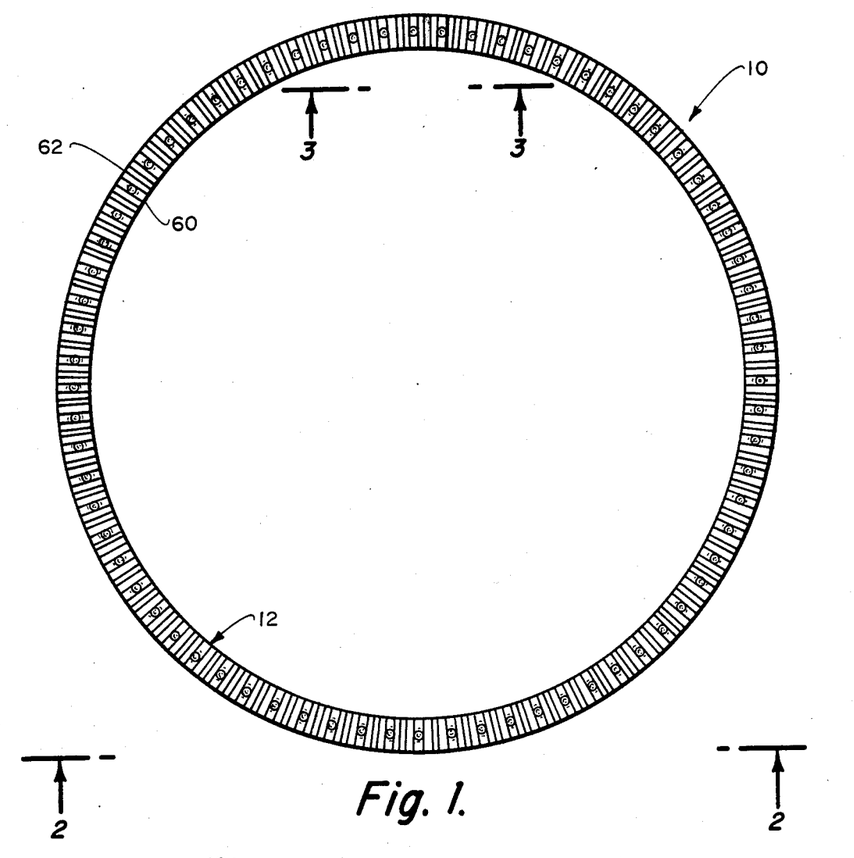
FIG. 1 is an end elevational view of the turbine engine seal fabricated in accordance with the teachings of my invention.

As the continuous strip 12 is wound on the mandrel 42 in the manner disclosed in FIG. 9 of the drawings, the conjoint radial and rotary deformation of the core strip takes place in that the hinge means constituted by the beads 24 and 26 permits the helical winding of the core strip 12 wherein the distortion of the respective nodes of the strip 12 takes place to provide the inner diameter 60, as shown in FIGS. 1 and 9 of the drawings, as opposed to the greater outer diameter 62.

Simultaneously with the function of the hinge means to accommodate the dimensional discrepancy between the inner diameter and outer diameter of the seal ring being fabricated from the continuous core strip 12, the preferable dimensional difference between the beads 24 and 26 permits rotation of the respective male and female nodes to accommodate distortion in the plane of alternate node surfaces.

By the susceptibility of the core strip 12 to such distortion, the anticlastic phenomenon characteristic of the attempted curvature of flat panels of honeycomb core manufactured from conventional semi-hexagonal core strip is totally eliminated and the sealing surfaces provided at the inner diameter 60 of the resultant engine seal 10 is uniform dimensionally and functionally and, thus, the need for subsequent machining of the sealing surface to eliminate anticlasticity is obviated.

Moreover, the external mounting surface provided by the uniform o.d. 62 of the engine seal 10 can closely relate to the inner surface of the mounting ring which locates the engine seal 12 in operative relationship with the turbine blades of the jet engine.

Although I have disclosed the fixture 40 as designed for hand poke welding of the successive beads 24 and 26 to one another, an automated device capable of successively welding said beads in operative relationship with one another to fabricate the engine seal 10 is eminently feasible and would be utilized where large quantities of engine seals of a particular diameter were produced. However, the hand fabrication method shown in FIG. 9 of the drawings is suitable where small quantities of engine seals are fabricated.

Conventional panels of honeycomb core material where the cells have hexagonal configurations are fabricated by conventional resistance welds where two layers of material are affixed to each other by passing a current through them from an electrode which pushes the layers together against a backup electrode or finger. The resultant welds are satisfactory because the backup electrode provides an additional heat sink to prevent oxidization of the heat-affected zone. However, the conventional multi-electrode resistance welding techniques utilized in the fabrication of conventional engine core panels are not applicable in the fabrication of the engine seal 10 in accordance with the teachings of my invention because of the fact that it is impossible to utilize electrodes inserted through the cells of the core because of the multiplicity of electrodes indicated and because of the fact that the walls of the cells would bind upon the electrodes as the cells are subjected to the radial deformation in the first and second senses discussed hereinabove.

Consequently, I have developed a method of welding the respective mating beads 24 and 26 of the male and female nodes 16 and 18 in operative relationship with each other which eliminates the disadvantages of conventional poke welding and provides a weld which is considerably stronger than that achieved by conventional poke welding techniques.

In conventional poke welding techniques involving the fabrication of panels incorporating hexagonal cells, the nodal areas, being flat, are juxtaposed to each other and the poke welder is engaged with the exposed area of one of the nodes to create a weld. However, since the nodes are flat, the electrode tip of the poke welder sinks in, due to the weld heat, and thins the material, which increases the resistance, which, in turn, increases the temperature so that there is no self-quenching or heat-sink effect.

Consequently, with conventional poke welding techniques, extremely careful control of the weld pulse is essential. Also, the thinned material is weaker than the adjacent material of the nodal areas and, for some reason, burns at the back side of the weld, frequently producing cracks, are created. This is a natural result of the thinning of the material during the creation of the weld and the lack of self-quenching or heat-sink phenomenon encountered where there is a backup electrode.

To eliminate the undesirable phenomena encountered with conventional poke welding, I utilize the welding technique illustrated in FIGS. 5 and 9 of the drawings wherein the welding electrode 70 is superimposed on the female bead 26 which is aligned with the internested corresponding male bead 24. Of course, the respective beads are cold-formed during the gear-forming process and provide an upwardly protruding pair of mated surfaces of essentially the same thickness as the rest of the core strip or ribbon 12. The electrode 70 is urged against the top of the female bead with a force of, for example, one pound, and the weld pulse is applied causing the electrode 70 to sink into the bead. As the electrode 70 sinks into the bead 26 it correspondingly sinks into the underlying bead 24 and pushes some of the material of the respective beads into the weld. This, together with the fact that the beads are getting wider as the electrode 70 advances, provides the desired effect of a weld that is self-quenching, i.e., requires more current as the tip sinks in. Thus, instead of the burns and cracks resulting from the utilization of conventional welding techniques, the weld zone which results from the application of the welding method of my invention provides a weld which is significantly stronger than a conventional poke weld and comparable to a top quality weld utilizing backup electrodes.

Figure 8:
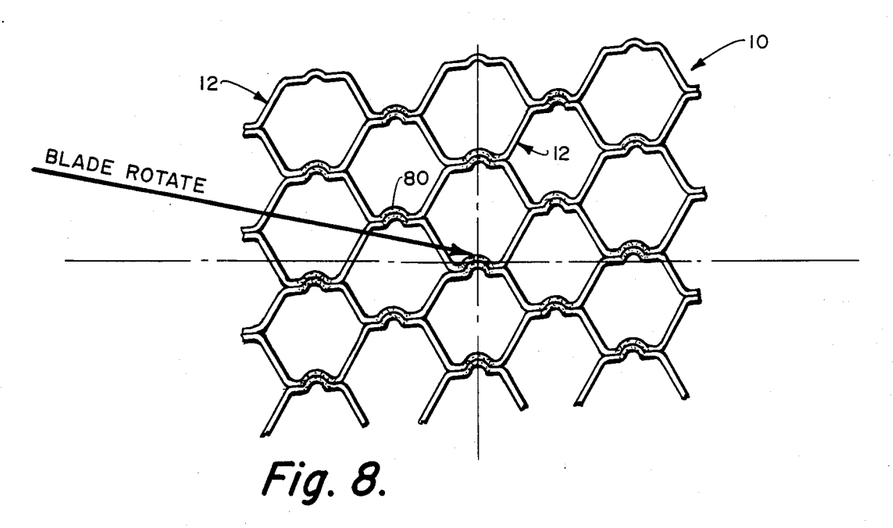
FIG. 8 illustrates the wiping effect of the axis of the rotation of the blades across the helically oriented successive convolutions of the core strip or ribbon.

The weldment 80 resulting from the use of the technique is illustrated in FIGS. 7 and 8 of the drawings. Inherent in the method of fabricating the engine seal 10 by utilizing the steps of the method of the invention, is the fact that the weldment of the respective nodes to one another occurs after the core strip 12 has been wound to achieve the required precise o.d. and i.d. of the engine seal 10 required by the operation of brazing the seal to its support ring. Consequently, when the engine seal 10 is installed in the backup ring or shroud, it is not subjected to the mechanical deformation which is encountered when successive lengths of conventional flat engine seal core are deformed into engagement with the housing or shroud of the engine in an attempt to create an engine seal.

Therefore, weld failures are eliminated and the necessity for subsequent repair of the core structure characterized by the utilization of conventional flat panels is eliminated. Moreover, the fit of the engine seal 10 manufactured by the method of my invention and utilizing the core strip of my invention is extremely precise, both at the o.d. where the perimeter of the seal 10 meets the ring and the i.d. where the sealing surface is engaged by the turbine blades.

Where a lesser degree of deformability of the core strip 12 is indicated, the elongated beads 24 and 26 may have alternative configurations substituted therefor such as circular dimples, or the like. However, I have found that the utilization of circular dimples, while providing an excellent weld in accordance with the teachings of my invention, somewhat restrict the flexibility of the core strips during the bending of the core strip in the two radial planes mentioned hereinabove, although providing the welding and locating functions of the previously discussed beads constituting the hinge means of the core strip.

Incidental to the manufacture of the engine seal 10 in accordance with the teachings of my invention is the fact that the sealing surfaces provided on the i.d. of the ring are all of uniform disposition since they have been fabricated with the accommodation of the hinge means and the internesting nodal areas of the core strip 12. Thus, the inequalities of engine seal structure resulting from the utilization of conventional flat hexagonal panel are eliminated. As a matter of fact, I have made several computations regarding the flexibility of the core strip of my invention in comparison with conventional semi-hex core strip and determined that the core strip of my invention is five times as formable into the engine seal configuration as conventional core strip.

This approach to bending conformability results in the uniformity of the i.d. of the engine seal as compared to conventional seals wherein bent zones have partially collapsed cells interspersed with zones of zero bending.

Of course, the uniformity of the cell configuration of the engine seal 10 materially enhances the ease with which the seal is secured, by conventional brazing techniques, to the supporting ring or shroud.

During the formation of the seal 10 keystoning of the core strip 12 may occur which is directly proportional to the core strip height and inversely proportional to the seal diameter. Usually, the keystoning, which is characterized by the dimensional difference between the inner edge of the seal and the outer edge of the seal, is negligible. For instance, in a four-foot diameter seal, 32 rotations of the core strip 12 will result in cumulative keystoning of 0.0083 inches, which would result in an angle of 2.386 degrees.

However, if the resultant angle is unacceptable, the core strip 12 can be formed with a slight keystoning shape in the direction opposite to that keystoning effect imparted by winding the core strip on a mandrel while welding the core strip 12 into the ultimate seal 10.

Another expedient to eliminate keystoning on smaller diameter seals is the tack welding of an auxiliary core strip to one edge of the basic core strip before forming the convolutions or corrugations in the core strip 12. The auxiliary core strip can constitute, in width, less than one-fifth or one-sixth of the width of the basic strip.

When the corrugations or convolutions are formed with the auxiliary strip on the outer periphery of the seal, the auxiliary strip imparts a prekeystoning effect which is the reverse of the keystoning which occurs during the winding of the strip into the seal configuration and, thus, prevents buildup of the angle at the end of the seal.

It is also possible to fabricate a flat core panel 100 from successively aligned core strips 12, as best shown in FIG. 11 of the drawings.

Another important aspect of the uniform configuration of the engine seal 10 fabricated by the teachings of my invention and the utilization of the welding technique of my invention is the provision of a weld which can be carefully controlled to precisely determine the extent to which the brazing material will be wicked between the confronting surfaces of the interconnected male and female nodes. This wicking is desirable, to a certain extent, because it materially enhances the bond between the mounting ring or shroud and the edge of the seal. However, when it progresses into the area of blade contact it becomes deleterious in that the brazing material is extremely abrasive and can cause deterioration and abrasion of the blade tips.

Once again, it should be pointed out that, while the beads on the nodes and the nodes themselves are shown as juxtaposed and internested, the spatial relationship between the confronting areas of the beads of the nodes can be adjusted by determining the respective dimensions of the internesting beads.

Figure 12:
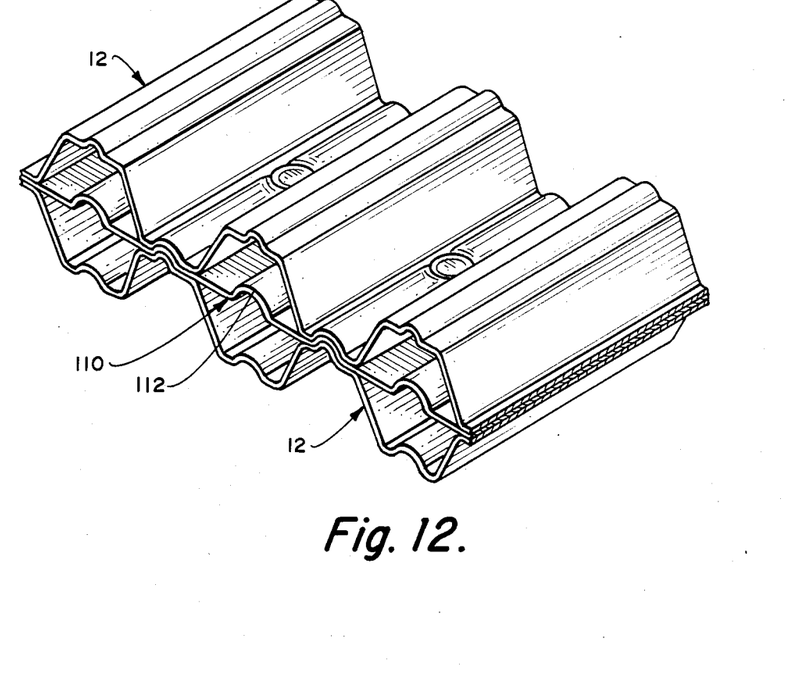
FIG. 12 is a view showing the interpositioning of a secondary core strip between the primary steps of the core structure constituting the seal.

As previously mentioned, the cell sizes of the resultant seal 10 are frequently extremely small. In order to create relatively smaller cells without alteration in the dimensions of the core strip 12, a secondary core strip 110 is provided, as best shown in FIG. 12 of the drawings, to reduce the cell area by one-half. When the secondary core strip is fed between the primary strips during the welding process, the cell area is cut in half. The weld is then made through the uppermost primary core strip 12, the secondary core strip 110 and the primary core strip already in place.

The secondary core strips can be fabricated from very thin material, such as 0.001 inches. The reduced dimensions of the secondary core strip will permit it to spring back when the seal is subjected to transient loads such as those resulting from hard landings and the like in conventional aircraft.

I thus provide by my invention a core strip particularly capable of being utilized in the fabrication of a unitary rotary seal construction and an alternative embodiment wherein the primary core strip is associated with a secondary core strip to reduce the resultant cell area by one-half.

Also provided by my invention is a rotary seal construction as disclosed and claimed and the method of making same.

The secondary core strip is formed with hinge means or beads 112 to cooperate with those of the primary core strips and these beads are spaced slightly farther apart than those on the primary strips so that as the secondary strip is wound into helical configuration the outer edge of said strip is fairly straight and the inner edge (smaller diameter) is slightly wavy. This very thin and wavy strip faces the turbine blade tips and provides some resilience to deformation and abrasion, resulting in a slightly reduced leakage area after being hit by the blade tips.

I claim:

1. In a seal for providing substantially cylindrical sealing surfaces, the combination of: a helically wound, sinuous strip whose alternate convolutions are vertically superimposed on one another; locating means on said convolutions for accurately registering said convolutions during the successive superimposition thereof; and securement means between said locating means to maintain said strip in a predetermined helical pattern.

2. The seal of claim 1 in which said sinuous strip is of corrugated configuration and includes alternate nadir and zenith nodal portions, said nodal portions of said strip being maintained by said securement means in juxtaposition to each other to define a plurality of apertures between successive convolutions of said helically wound strip.

3. The strip of claim 2 in which said zenith nodal portions of said corrugated strip have said locating means constituted by male protrusions thereupon and nadir portions of said strip have female recesses therein for the reception of said male protrusions as said nadir and zenith portions of said strip are juxtaposed to one another prior to the securement thereof.

4. In a seal for providing a plurality of sealing surfaces arranged in a cylindrical configuration, the combination of: an elongated strip of metal, said strip being corrugated to provide alternate zenith and nadir corrugation thereupon and said zenith and nadir corrugations incorporating cooperative locating means, said strip being helically wound with respective nadir and zenith corrugations superimposed on one another and said locating means operatively associated with one another in horizontal planes and successively registering said nadir and zenith corrugations and weldments between said locating means to maintain said strip in its helical configuration and to define spaces between said sealing surfaces of said strip.

5. The seal of claim 4 in which said locating means are constituted by male protrusions on said zenith corrugations and female receptacles on said nadir corrugations.

6. In a method of fabricating a seal presenting a plurality of cylindrically arranged sealing surfaces, the steps of: providing a cylindrically generated winding form; providing an elongated metallic strip of sinuous configuration having alternate zenith and nadir sinuosities; winding said strip in a helix around the perimeter of the said cylindrically generated form while sequentially superimposing said zenith and nadir sinuosities; and securing said nadir and zenith sinuosities to one another.

7. The method of claim 6 in which cooperative locating means are provided on said zenith and nadir sinuosities of said strip and said locating means sequentially position said nadir and zenith sinuosities in operative relationship with each other in horizontal planes prior to the securement thereof.

8. The method of claim 7 in which said locating means are constituted by male protrusions on said zenith sinuosities and female recesses in said nadir sinuosities and said protrusions are sequentially located in said recesses prior to the securement of said zenith and nadir sinuosities to one another.

9. The method of claim 6 including the step of removing said seal from operative relationship with said cylindrically generated surface.

10. The method of claim 6 in which said securing step is accomplished by resistance welding.

11. In a method of fabricating a seal which presents a plurality of sealing surfaces disposed in a cylindrical configuration, the steps of: providing an elongated convoluted strip having alternate zenith and nadir convolutions; winding said strip in a helical configuration while locating the nadir and zenith convolutions of said strip in juxtaposition to one another; and sequentially securing said nadir and zenith convolutions to one another in horizontal planes as said strip is progressively wound into a helical configuration.

12. The method of claim 11 in which said nadir and zenith convolutions have cooperative hinge and locating means thereupon and said locating means are utilized to properly sequentially juxtapose said zenith and nadir convolutions during the helical winding of said strip prior to the securing thereof.

13. In a welding method for joining two superimposed nodes of a corrugated core strip together, the steps of: forming male and female protrusions on mating nodes; sequentially engaging said protrusions; impressing a welding potential on said unsupported protrusions by a welding electrode from one side thereof; and urging the material of said protrusions into said weld area.

* * * * *